United States Patent
Jansen et al.

[11] Patent Number: 5,122,966
[45] Date of Patent: Jun. 16, 1992

[54] COMPUTER GENERATED TOOL PATH INTERFERNCE CHECK METHOD

[75] Inventors: Willem Jansen, Weston; Alan R. Levine, Westwood; Melvin Platt, Holliston, all of Mass.

[73] Assignee: Northern Research & Enginerring, Woburn, Mass.

[21] Appl. No.: 408,519

[22] Filed: Sep. 18, 1989

[51] Int. Cl.⁵ ............................................. G06F 15/46
[52] U.S. Cl. ........................... 364/474.2; 364/474.22; 364/474.24; 364/474.26
[58] Field of Search ........... 364/474.2, 474.26, 474.24, 364/474.22

[56] References Cited

U.S. PATENT DOCUMENTS

| | | | |
|---|---|---|---|
| 4,489,377 | 12/1984 | Mawyer et al. | 364/474.2 |
| 4,513,366 | 4/1985 | Munekata et al. | 364/474.2 |
| 4,633,409 | 12/1986 | Sekikawa . | |
| 4,649,498 | 3/1987 | Kedem et al. . | |
| 4,720,796 | 1/1988 | Kishi et al. | 364/474.2 |
| 4,721,952 | 1/1988 | Huber . | |
| 4,731,607 | 3/1988 | Yoneda et al. . | |
| 4,758,961 | 7/1988 | Uemura et al. | 364/474.2 |
| 4,788,481 | 11/1988 | Niwa . | |
| 4,791,579 | 12/1988 | Kranitzky . | |
| 4,821,201 | 4/1989 | Kawamura et al. | 364/474.2 |
| 4,888,707 | 12/1989 | Shimada | 364/474.2 |
| 4,916,990 | 4/1990 | Dolansky et al. | 364/474.2 |
| 4,951,217 | 8/1990 | Clark et al. | 364/474.2 |
| 4,979,128 | 12/1990 | Seki et al. | 364/474.2 |
| 4,994,977 | 2/1991 | Tsujido | 364/474.26 |

Primary Examiner—Jerry Smith
Assistant Examiner—Jim Trammell
Attorney, Agent, or Firm—Glenn B. Foster; Michael H. Minns

[57] ABSTRACT

A computer generated tool path interference check including a method of checking for interference between a workpiece and a cutting tool during the numerical control machining of the workpiece by the cutter tool. Computer simulation is utilized to determine at least a portion of the workpiece that is desired to be checked for possible interference with the path of the cutter tool. The spatial relationship between the workpiece and the cutter tool during the machining are modelled as the relative positioning of the computerized images of the portion of the workpiece and the cutter tool, respectively. The relative positioning of the computerized images of the portion of the workpiece and the cutter tool are observed to check whether an interference will occur between the workpiece and the cutter tool during the machining.

9 Claims, 2 Drawing Sheets

COMPUTER GENERATED TOOL PATH INTERFERNCE CHECK METHOD

BACKGROUND OF THE INVENTION

This invention relates generally to computers with graphic display systems, and more particularly to a graphic display used to determine interference between workpieces and their associated cutting tools as means to verify computer generated cutting tool paths.

For cutting irregularly shaped parts such as turbomachinery elements, it is desirable to use complex cutting equipment wherein both the cutter and the workpiece holder may be movable about two or more axes simultaneously.

Often, interference between workpieces and cutters in numerically controlled cutters is determined by applying trial cuts to physical prototype workpieces, utilizing the actual cutting program which will be used to cut the final parts. However the considerable machine time required for the trial cuts, as well as the associated labor and material costs, often makes it desirable to simulate the trial cuts by illustrating the relationship between the cutter and the workpiece on a computer aided design/ computer aided manufacture (CAD/-CAM) system.

Two common CAD/CAM methods which are presently applied in the above application are solid-shaded graphic display and wire frame graphic display methods.

The solid shaded graphic display utilizes a three dimensional graphic image which represents the shape of the original workpiece, even though the object is still displayed on a two dimensional graphic display terminal. The computer program input to the actual cutter and workpiece, along with the cutter tool physical parameters, determine the motion of the cutter and/or the workpiece, and modifies the shape of the image by subtracting primitive shapes from the image. The displayed shape reflects how the workpiece would be altered during each cutting step, thereby modelling the actual cutting process. From this, the final image will indicate whether any actual interference did occur during the machining process by showing cut edges.

The solid-shaded graphic displays are limited in that relatively sophisticated computer equipment is required to provide the shape and shading required for this type of display.

In wire frame systems, the final desired image of the workpiece is input into the computer. The path of the cutter as it shapes the workpiece, with respect to the shape of the final workpiece, is viewed to ensure that at no time during the cutting process of the workpiece will the cutting tool interfere with the actual final workpiece.

Wire frame technology also requires relatively complex computer hardware to operate. It is also often difficult to see whether an interference does exist between the workpiece and the cutter due to the complexity of the displays.

In both the solid-shaded and the wire frame type graphic displays, a large number of pixels are required to display the image. The large number of required pixels adds to the complexity of the display image.

The usual display method for both graphic display systems is to maintain a stationary workpiece image while the viewer observes an animated cutter tool image. Due to the positioning of the images on a two dimensional computer display screen, it is often impossible to determine whether an interference exists since the workpiece is displayed from only one view.

The foregoing illustrates limitations known to exist in present methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a computer generated tool path interference check including a method for checking for interference between a workpiece and a tool during the numerical control machining of the workpiece by the tool. Computer simulation is utilized by determining a portion of the workpiece that is desired to check for possible interference with the path of the tool.

It is to be understood that virtually any CAD-CAM system can be utilized to perform the tasks outlined below. The critical thrust of the present invention is not the specifics of the CAD-CAM system, but rather the ability to perform a relatively complex interference check with simplified computer graphics.

The actual spatial relationship between the workpiece and the tool during machining are modelled as the relative positioning of the computerized images of the portion of the workpiece and the tool, respectively. The relative positioning of the computerized images of the portion of the workpiece and the tool are observed to check whether an interference will occur between the workpiece and the tool during machining.

The foregoing and other aspects will become apparent from the following detailed description of the invention when considered in conjunction with the accompanying drawing. It is to be expressly understood, however, that the drawing figures are not intended as a definition of the invention, but are for the purpose of illustration only.

DETAILED DESCRIPTION

This graphic display method is especially suitable to model numerical control machining of complex shaped machine elements, such as turbomachinery, where a tool assumes unusual attitudes with respect to a workpiece when going through a machining process. This method may also be applied to those instances where both the cutter tool and the workpiece have the capability to be rotated about several axes during machining.

Figure 1:
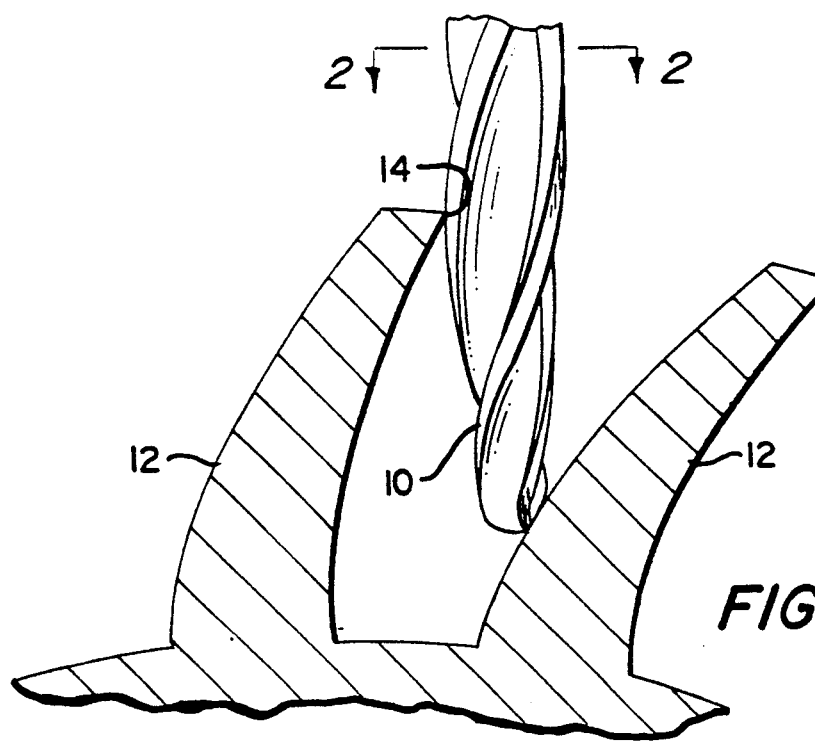
FIG. 1 is a side cross sectional view illustrating the computer generated tool path interference check, between the workpiece 12 and the tool 10 of the present invention, an interference exists between these two members.

As shown in FIG. 1, the simplified display of the interaction of a cutter tool (such as a milling cutter) image 10, and a workpiece image 12 are displayed on a simplified CAD/CAM graphic display. The simplified display of the instant invention is two-dimensional. It is necessary for the system, or the operator, to select a nominal view to determine the location of a portion of the workpiece 14 that is likely to come into undesired contact with the cutting tool, thereby creating an interference. This will be the only section displayed on the graphic display. Note that the actual workpiece and cutting tool are not shown in any figure since their function is generally well known in the prior art.

The operator only has to input into the computer such information as the cutter tool shape and dimension, the shape of the workpiece portion, the dimensional parameters of the machine in which the cutter tool is mounted, and the computer instructions input into the machine during the machining process. From this the CAD/CAM system will model the successive relative position of the cutter tool image 10 and the workpiece image 12, and the operator may determine if there is any contact between the workpiece and the cutter tool during the machining process.

For example, if there is any position where there may be interference, such as in FIG. 1, the display can be altered to view the workpiece image 12 and the cutter tool image 10 from another view (at the same instant) to determine whether there actually is any interference. If the side display is similar to FIG. 2, then there would be an interference. However, if the side display is similar to FIG. 3, then no interference would exist at this instant. Since this system permits viewing of the images from multiple two dimensional views, the operator can consider interference between the workpiece and the cutter tool in three dimensions.

Figure 2:
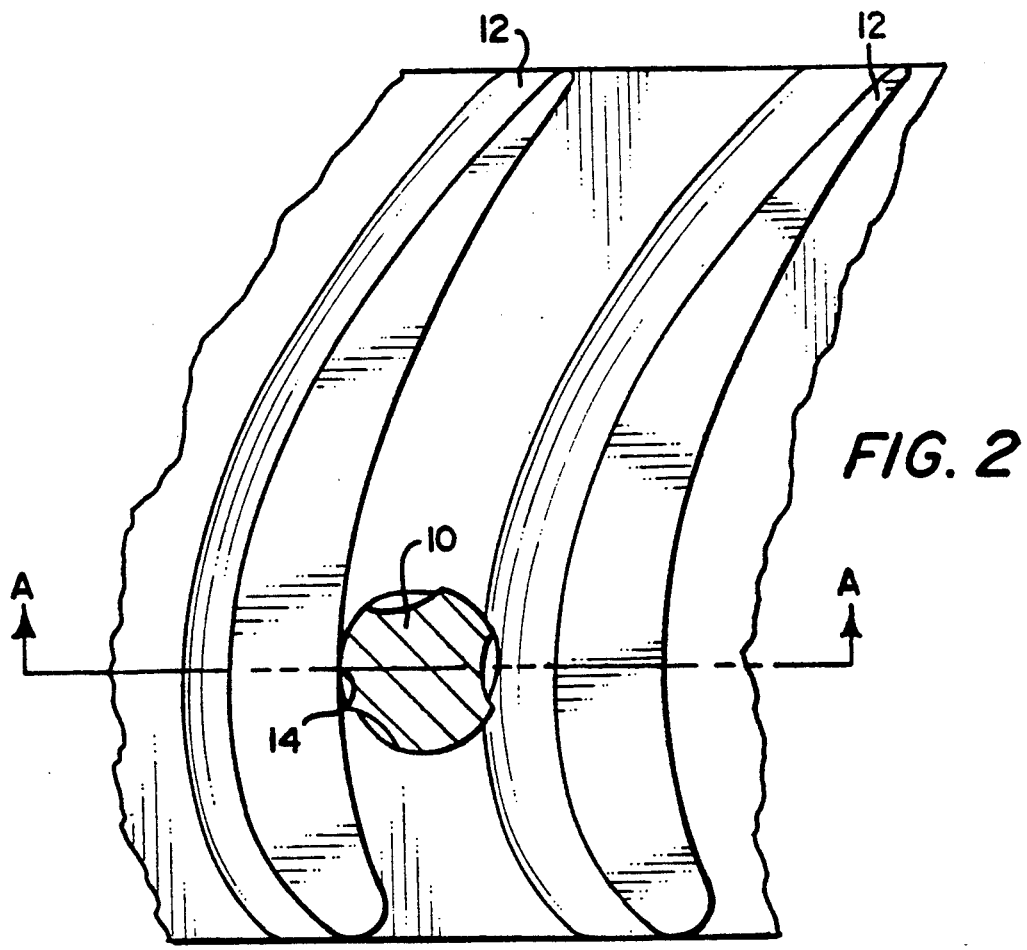
FIG. 2 is a partially sectioned top view taken along sectional lines 2—2 of FIG. 1.
Figure 3:
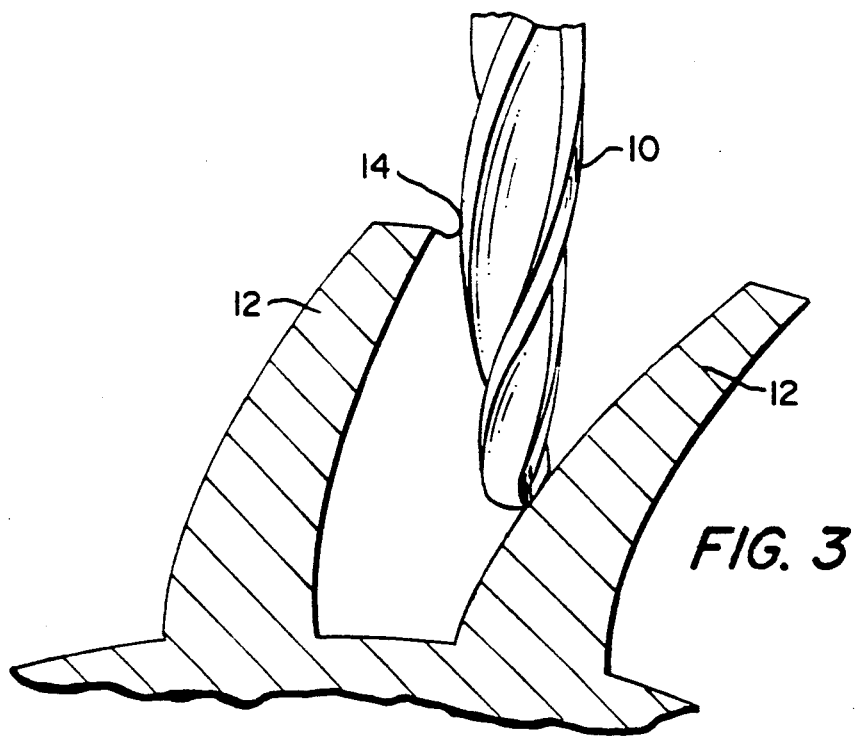
FIG. 3 is a view similar to FIG. 1, except where no interference exists between the workpiece 12 and the tool 10.
Figure 4:
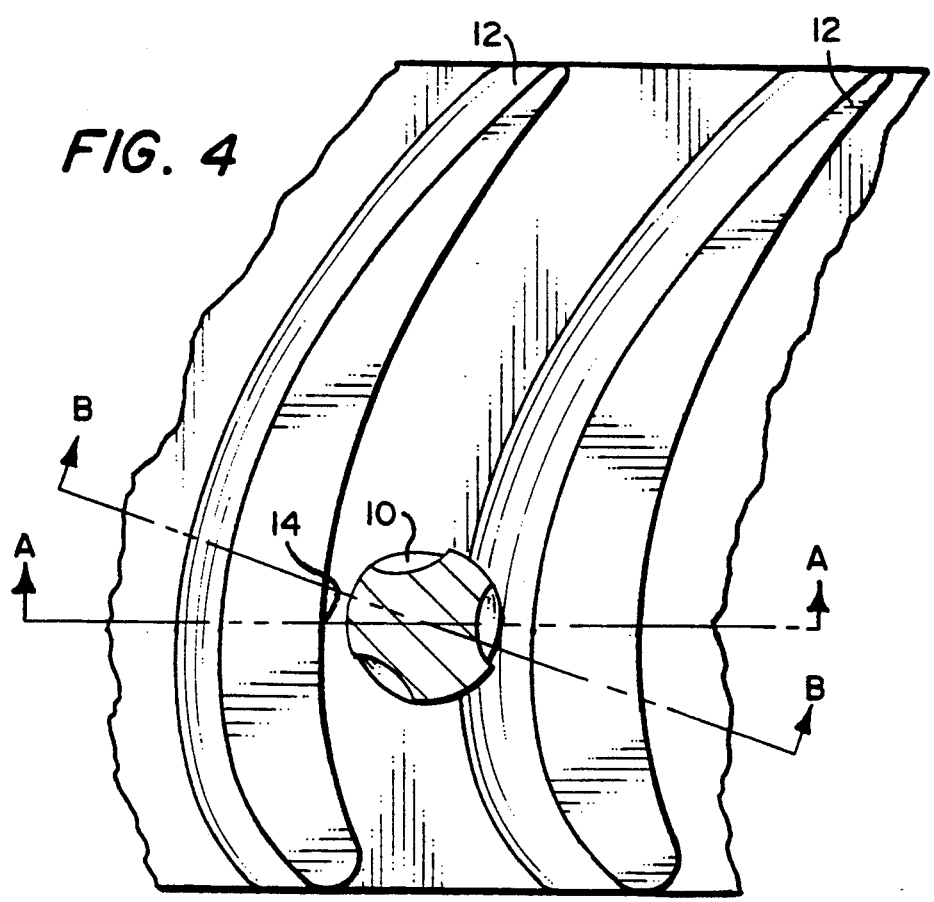
FIG. 4 is a similar top graphic display view to FIG. 2 where two alternative sectional views A—A and B—B may be displayed, depending upon which one the operator considers would best show the possible interference.

The viewing of the alternate side views can be through a single sectional line A—A, as shown in FIG. 2, or through multiple sectional lines A—A and B—B as shown in FIG. 4. If there are more than one of the sectional views, then the operator should determine which view would most clearly illustrate the interference, or if both alternate views are required.

The period between each of the views can be altered such that at the times when there is clearly no interference, the cutter tool path commands can be run through quickly. In those periods that there is a possibility of interference, the cutter tool path commands can be analyzed more slowly and carefully.

This computer display method requires the illumination of only those pixels on the computer screen which define the outline of the workpiece and the cutter tool, instead of considerable shading or structural detail which is required in the more complex computer programs commonly used today. This not only saves computer input time and the associated expenses, but also permits the use of simpler computer hardware than could be used for other display methods.

One major advantage of this type of display method is that the display may be oriented, as shown in FIGS. 2 and 4, such that the cutter tool appears stationary, and the workpiece is animated to move relative to the cutter tool which is fixed on the screen. This display method makes detecting interferences considerably simpler than in the usual display systems where the cutter tool is animated and the workpiece is stationary. In this manner, interference of complex three dimensional shapes can be accurately and quickly determined by using simple two dimensional display techniques.

While this invention has been illustrated and described in accordance with a preferred embodiment, it is recognized that other variations and changes may be made therein without departing from the invention as set forth in the claims.

What is claimed is:

1. A method of checking for interference between a workpiece and a tool prior to an anticipated machining process utilizing computer graphic simulation involving the steps of:

determining at least a portion of the workpiece that is desired to be checked for possible interference with the tool;

creating a computerized image of the portion of the workpiece after the anticipated machining process;

creating a computerized image of the tool;

modelling a spatial relationship between the computerized images of the portion of the workpiece and the portion of the tool during the anticipated machining process by displaying relative positioning of the computerized images of the portion of the workpiece and the tool, respectively;

observing the relative positioning of the computerized images of the portion of the workpiece and the tool to determine whether an interference occurs between the workpiece and the tool during the anticipated machining process in a first plane; and observing the relative positioning of the computerized images of the portion of the workpiece and the tool to determine whether an interference occurs between the workpiece and the tool during the anticipated machining process in a second plane, said second plane being distinct from said first plane;

the computerized tool image being observed at a stationary position, and the workpiece image being animated to move relative to the tool.

2. The method of interference checking as described in claim 1, wherein which the computer graphic stimulation is accomplished by a CAD/CAM system.

3. The method of interference checking as described in claim 1, wherein the computerized image of the workpiece is derived from a computer instruction input used in forming the workpiece.

4. The method of interference checking as described in claim 1, wherein the observing of the relative positioning of the images of the tool and the workpiece are viewed from a two dimensional view.

5. The method of interference checking as described in claim 1, wherein the first plane and the second plane are not parallel to each other.

6. A method of checking for interference between a workpiece and a tool prior to an anticipated machining process, the anticipated machining process comprising a set of computer instructions, the method of checking for interference utilizing computer graphic simulation involving the steps of:

determining at least a portion of the workpiece that is desired to be checked for possible interference with the tool;

creating a computerized image of the portion of the workpiece after the anticipated machining process;

creating a computerized image of the tool;

modelling a spatial relationship between the computerized images of the portion of the workpiece and the portion of the tool during the anticipated machining process by displaying relative positioning of the computerized images of the portion of the workpiece and the tool, respectively;

observing the relative positioning of the computerized images of the portion of the workpiece and the tool to determine whether an interference occurs between the workpiece and the tool during the anticipated machining process in a first plane;

observing the relative positioning of the computerized images of the portion of the workpiece and the tool to determine whether an interference occurs between the workpiece and the tool during the anticipated machining process in a second plane said second plane being distinct from said first plane; and revising the computer instruction set used in forming the workpiece based upon said interference; the computerized tool image being observed at a stationary position, and the workpiece image being animated to move relative to the tool.

7. The method of interference checking as described in claim 6, wherein which the computer graphic simulation is accomplished by a CAD/CAM system.

8. The method of interference checking as described in claim 6, wherein the observing of the relative positioning of the images of the tool and the workpiece are viewed from a two dimensional view.

9. The method of interference checking as described in claim 6, wherein the first plane and the second plane are not parallel to each other.

* * * * *